United States Patent
Pasternack et al.

(10) Patent No.: US 6,859,451 B1
(45) Date of Patent: Feb. 22, 2005

(54) SERVER FOR HANDLING MULTIMODAL INFORMATION

(75) Inventors: Henry Adam Pasternack, Ville Mont-Royal (CA); Nicola Fumai, Montreal (CA); Daniel Ferrero, Montreal (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/062,969

(22) Filed: Apr. 21, 1998

(51) Int. Cl.[7] ............................................... H04L 12/66
(52) U.S. Cl. ....................................... 370/352; 370/462
(58) Field of Search ................................ 370/352, 353, 370/354, 355, 356, 400, 401, 402, 403, 404, 405, 410, 447, 461, 462, 463, 465, 466; 379/88.01, 88.02, 88.06, 88.17, 88.04, 93.09; 704/231, 246, 270, 275; 709/217, 218, 219

(56) References Cited

U.S. PATENT DOCUMENTS

| | | | | |
|---|---|---|---|---|
| 5,610,910 A | * | 3/1997 | Focsaneanu et al. | 370/351 |
| 5,654,957 A | * | 8/1997 | Koyama | 370/355 |
| 5,675,507 A | | 10/1997 | Bobo, II | 364/514 |
| 5,764,736 A | * | 6/1998 | Shachar et al. | 379/93.09 |
| 5,884,032 A | * | 3/1999 | Bateman et al. | 709/204 |
| 5,884,262 A | * | 3/1999 | Wise et al. | 704/270 |
| 5,915,001 A | * | 6/1999 | Uppaluru | 379/88.22 |
| 5,953,392 A | * | 9/1999 | Rhie et al. | 379/88.13 |
| 5,995,607 A | * | 11/1999 | Beyda et al. | 379/202.01 |
| 6,044,403 A | * | 3/2000 | Gerszberg et al. | 709/225 |
| 6,067,516 A | * | 5/2000 | Levay et al. | 704/244 |
| 6,101,472 A | * | 8/2000 | Giangarra et al. | 704/275 |
| 6,101,473 A | * | 8/2000 | Scott et al. | 704/275 |
| 6,141,345 A | * | 10/2000 | Goeddel et al. | 370/389 |
| 6,205,135 B1 | * | 3/2001 | Chinni et al. | 370/356 |
| 6,295,293 B1 | * | 9/2001 | Tonnby et al. | 370/389 |

OTHER PUBLICATIONS

Lee, Hang–Seop, et al. "Speech Web Browser Using Variable Vocabulary Word Recognition", AVIOS '97, 16th Annual International Voice Technologies Applications Conference, San Jose, CA, Sep. 8–11, 1997.

Hunt, Andrew. "Deploying Speech Technology Applications in Java", AVIOS '97, 16th Annual International Voice Technologies Applications Conference, San Jose, CA, Sep. 8–11, 1997.

* cited by examiner

*Primary Examiner*—Kwang Bin Yao
(74) *Attorney, Agent, or Firm*—Angela C. de Wilton

(57) ABSTRACT

To integrate telephony with Web-based information services, and develop multi-modal telephony applications that combine graphical input and output with traditional speech-based user interfaces, a Web server for handling information which is in these different modal forms, has an internet interface for supporting connections on the internet, and a terminal interface for supporting connections from the server to user terminals, and for passing information in at least one of the modal forms. A service controller controls input or output of the information on the interfaces, and processes the information received from or sent to either interface, according to its modal form.

16 Claims, 11 Drawing Sheets

SERVER FOR HANDLING MULTIMODAL INFORMATION

RELATED APPLICATIONS

This application is related to U.S. Pat. No. 6,012,030 issued on Jan. 4, 2000, entitled Management of Speech and Audio Prompts in Multimodal interfaces, and U.S. Pat. No. 6,018,711 issued an Jan. 25, 2000, entitled Interface Management for communication Systems and Devices, both of which were filed concurrently herewith, and both of which are hereby incorporated by reference. This application is also related to U.S. Pat. No. 6,351,771 issued Feb. 26, 2002, entitled Distributed Service Network and U.S. Pat. No. 6,310,889 issued Oct. 30, 2001 entitled "Method of Servicing Data Access Request from Users Connecting to a Distributed Service Network", both of which were filed on Mar. 12, 1998, and U.S. patent application Ser. No. 09/041,129, filed on Mar. 12, 1998, entitled "Reconfigurable Service Network", and application U.S. patent application Ser. No. 09/041,131, filed on Mar. 12, 198, entitled "A Data Stream Conversion System and Method" all claiming a foreign priority date of Nov. 10, 1997 and are hereby incorporated by reference. This application is also related to U.S. patent application Ser. No. 08/992,630 filed on Dec. 19, 1997, entitled "Multimodal User Interface", and hereby incorporated by reference.

BACKGROUND TO THE INVENTION

1. Field of the Invention

The invention relates to servers for handling information which is in different modal for, to servers for interfacing between telephone calls and the internet, to methods of using such servers, to methods of using a multi-modal service provided by a server on the internet, and to software on a computer readable medium for carrying out such methods.

2. Background Art

It is known to integrate telephone and computer technologies in many ways. For example, it is known to provide a telephone which can be controlled by a desktop computer to enable the telephone to be controlled from menus on the screen of the computer. This enables numbers to be selected from on screen directories, and calls to be initiated by mouse button click.

Integration of telephony with the internet has also been tried in various ways. One example is mobile telephones having small displays and rudimentary internet access software for email and Web page downloading. A further example is a system enabling a user viewing a Web page the opportunity to click on a button to launch a telephone call which will connect their telephone to an agent of the business owning the Web page. This can be achieved either by a call over the PSTN (Public Service Telephone Network), or, if the user has a suitably equipped computer, by a voice over IP telephone conversation. The agent may given automatically a view of the same Web page as the user sees.

Such systems may be implemented using a Web server which is operable to respond to queries from the user's Web browser to fetch Web pages, and to execute CGI (Common Gateway Interface) scripts outside the server. CGI scripts are a mechanism to enable Web pages to be created at the time they are requested, enabling them to be tailored to the requester, or to contain up to date information from a database for example. For features such as animation sequences, or audio files which need to be played on the user's machine, it is known to send Java programs called applets to the user's machine, for execution there.

It is also known to provide computer speech recognition of speech on a telephone call, for applications such as directory assistance.

Various event-driven, state-based frameworks are also known to support speech recognition application development. They do not necessarily provide the functionality to develop complex applications, or can be difficult to interface to outside data sources. They may have separate graphical and speech user interfaces. It may be awkward to synchronize the two interfaces and implement complex applications using this loosely-integrated architecture. Also, it may be awkward to synchronise multiple interfaces using this architecture. Access to the internet may require a custom bridge between the state machine framework and the low level networking features of the host operating system. Specialised facilities for talking to the internet are not providedis difficult to manage the additional complexity and synchronisation problems caused by trying to support access to the internet.

It is also known to provide Web browsers with a user interface capable of supporting speech recognition in addition to the standard graphical interface. Similar capabilities are known in user terminals not having Web browsers.

It is also known to extend the capabilities of Web browsers through "plug-ins" which can be downloaded by the browser from another Web site, to enable the browser to handle new data formats such as audio files.

SUMMARY OF THE INVENTION

It is an object of the invention to provide improved methods and apparatus.

According to a first aspect of the invention there is provided a server for handling information which is in different modal forms suitable for more than one mode of user interface, the server comprising:

an internet interface for supporting one or more connections on the internet;

a terminal interface for supporting one or more connections from the server to user terminals, and for passing information in at least one of the modal forms; and a service controller for controlling input or output of the information on the terminal interface and the internet interface, and for processing the information received from or sent to either interface, according to its modal form.

Advantages of having multi modal capability, or modal sensitivity in the server rather than only in the user's terminal include:

a) it enables advanced services to be offered to "thin" clients, i.e. user's terminals with limited physical processing and storage, which would be unable to support such advanced services locally;

b) it enables new capabilities to be added to services without having to distribute software such as plug-ins to user's browsers, which:
  1) unburdens the user from having to install the plug-in;
  2) avoids taking up storage space in the user's terminal;
  3) eliminates the need for a mechanism in the server for distributing the plug-ins;

c) it is easier to build services which can be used by a variety of different types of user's terminals, because the server can choose how to adapt the manner in which it sends and receives information to or from the terminal. Otherwise the terminal would have to adapt the manner of the communication according to its capabilities, which is outside the control of the service designer.

d) it facilitates deployment of experimental features without the risk of distributing potentially unreliable software which might have unforeseen consequences for the user's terminal;

e) it enables services to be installed at a central location which may be more accessible to hubs of various communication networks and thus make it easier to transfer data, e.g. in higher volumes, at greater speed or between networks; and f) it enables bandwidth between the user and the server to be used more efficiently when information from different sources and in different modes is filtered, integrated and redistributed in condensed form at the server.

Preferably the service controller is operable to interact with a user having a multi-modal terminal, and to select which modal form or forms to use. An advantage of selecting modes is that a service designer can adapt a service to suit the interface mode characteristics of different terminals.

Preferably the selection is made according to the content of the information, and the context of the interaction. This is advantageous because the user interface can be adapted to make the communication more effective, and by having the adaptation made in the server, the service designer has more control over the user interface. This can be important because small or subtle changes in the user interface can have disproportionate effects.

Preferably the service controller is operable to receive inputs in different modes simultaneously from the same user, to resolve any conflicts, and determine an intention of the user based on the inputs. If the server receives conflicting information, perhaps from user mistakes, or poor performance of communication in one or more modes, e.g. lots of background noise in an audio channel, the service designer now has the capability to handle such situations.

Preferably the terminal interface is arranged to recognise speech as an input. Many applications can be enhanced by making use of this interface mode either to complement textual or graphical input, or instead of them.

Preferably the terminal interface is arranged to generate audio as an output mode. Many applications can be enhanced by making use of this interface mode, often to complement a visual display or in place of the visual display.

Preferably the service controller is arranged to conduct a dialogue with the user in the form of a sequence of interactions. This is particularly useful when the mode of interaction limits the amount of information which can be passed in each interaction, e.g. speech recognition may be limited to single utterances from the user. It is also useful in cases where the system response at any instance depends on earlier interactions in the sequence, and to enable context dependent responses.

Preferably the server further comprises means for translating information from one modal form to another. This may enable new services to be created by bridging between channels operating in different modes, e.g. an email to telephone bridge, to enable emails to be read or delivered from a telephone.

Preferably the server further comprises means for initiating a connection to the user's terminal. This is advantageous in cases where the response may be delayed, or to enable a user to be alerted of some event.

Preferably the server comprises a link to a telephone network, and a call processor for making and receiving telephone calls on the telephone network. The wide reach and ease of use of the telephone network make it advantageous to provide connections to enable services to make use of telephony and the internet.

According to another aspect of the invention, there is provided a server for interfacing between telephone calls and the internet, and comprising:

a telephony interface for receiving or making a telephone call, and arranged to interact with a user on the call by recognising speech or generating audio signals;

an internet interface for receiving or outputting information from or to other parts of the internet; and a controller for controlling interaction between the telephony interface and the internet interface.

According to another aspect of the invention, there is provided a method of using a server to handle information in different modal forms suitable for more than one mode of user interface, and comprising the steps of:

supporting one or more connections on the internet;

supporting one or more connections from the server to the user terminals;

passing information in different modal forms between the user and the server;

controlling input or output of the information on the terminal and internet interfaces; and processing the information received from or sent to either interface, according to its modal form.

According to another aspect of the invention, there is provided a method of using a multi-modal service provided by a server on the internet, the server having an internet interface for supporting one or more connections on the internet, a terminal interface for supporting a connection to a user of the service, and for passing information in at least one of the modal forms; and a service controller for controlling input or output of information on the terminal interface and the internet interface, and for processing the information received from or sent to either interface, according to its modal form, the method comprising the steps of:

providing input to the terminal interface of the server;

engaging in a dialogue with the server to cause the server to process the information according to its modal form; and receiving a response from the terminal interface of the server, according to the result of the information processing.

Another aspect of the invention provides software stored on a computer readable medium for carrying out the above methods.

Any of the preferred features may be combined, and combined with any aspect of the invention, as would be apparent to a person skilled; in the art. Other advantages will be apparent to a person skilled in the art, particularly in relation to prior art other than that mentioned above.

To show, by way of example, how to put the invention into practice, embodiments will now be described in more detail, with reference to the accompanying drawings.

DETAILED DESCRIPTION

Information in different modal forms is defined as information for different modes of interface with a human user. Thus an audio signal is in the audio modal form, even if it is represented as data packets. Different modes of interface are distinguished by whether they appeal to or use different human sensory faculties. More than one distinct type of user interface may make use of the same mode, e.g. text and graphics both use the visual mode. Input modes can be distinguished from output modes, for example a user might press keys on a telephone handset, (tactile) and hear a response (audio). Different modes have different characteristics in terms of e.g. type of information which can be conveyed, the amount of information, the reliability of the mode, speed of use, and suitability for user circumstances.

Figure 1:
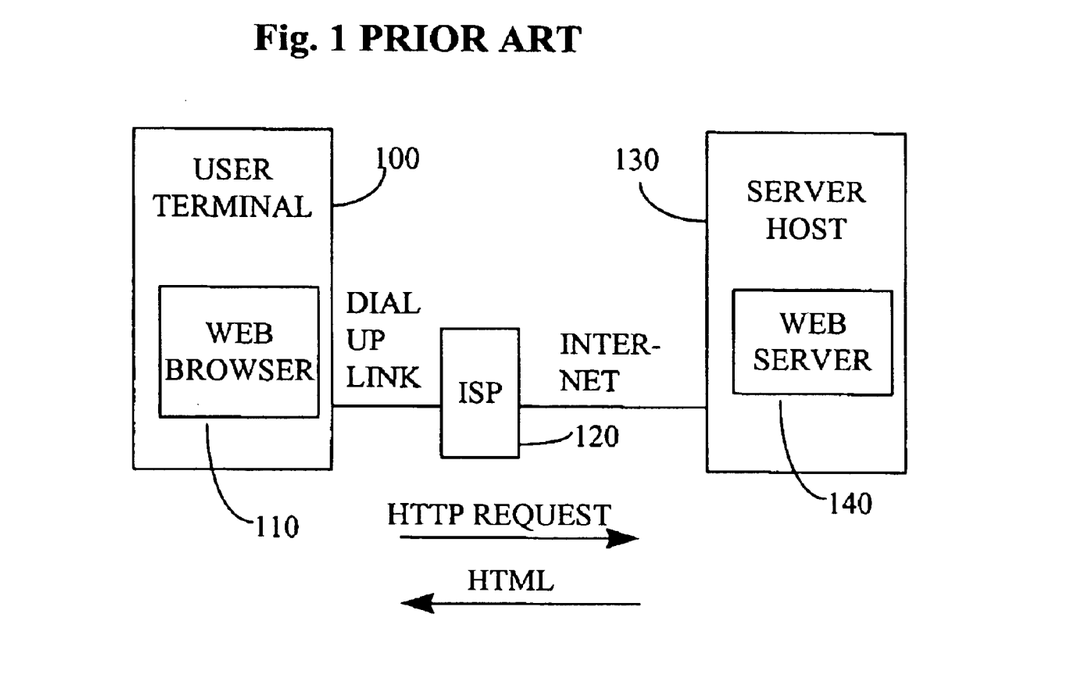
FIGS. 1 to 3 show known arrangements.
Figure 2:
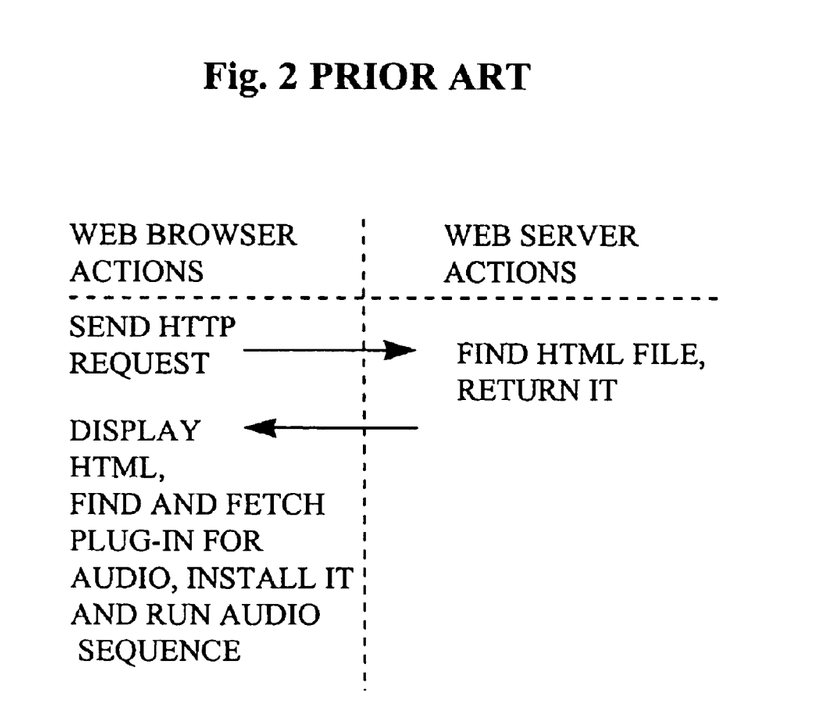
Figure 3:
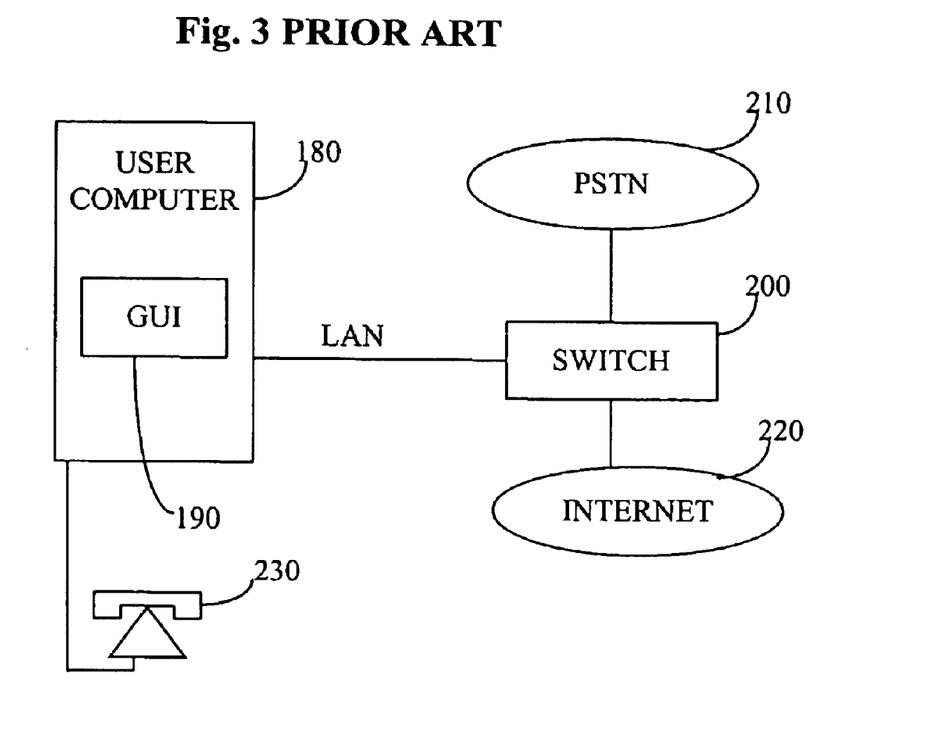

FIGS. 1-3, Prior Art

FIG. 1 shows in schematic form a known arrangement for accessing information available on the World Wide Web. A user terminal 100 typically in the form of a desktop computer, is provided with Web browser software 110. This can send HTTP requests via a dial-up link to an ISP (Internet Service Provider) 120, to a Web server 140 running on a server host 130. The Web server finds the appropriate Web page referred to in the HTTP request, and returns it to the Web browser. The Web browser is able to interpret the HTML (Hypertext Mark-Up Language) Web page, to display it on the screen of the user's terminal.

FIG. 2 shows in schematic form actions of the Web browser and actions of the Web server shown in FIG. 1, when it is required to expand the capabilities of the Web browser using a plug-in. The Web browser begins as before by sending an HTTP request to the Web server. The Web server finds the HTML file for creating the Web page, and returns it to the Web browser. The Web browser displays the Web page by interpreting the HTML, and when it reaches a part of the HTML file which contains a reference to a further file, in a format which the browser is unable to process, for example, an audio file, the browser may find and fetch a plug-in for that audio file. The browser is arranged to determine the type of plug-in which is required, and to install it, then use it to process the audio file, to output its contents using whatever audio output hardware is present on the user's terminal.

FIG. 3 shows in schematic form another known arrangement, in which a conventional telephone handset 230 is linked to a user's computer 180, in a form of computer telephony integration. A user's computer 180 has a display controlled by a graphical user interface (GUI) 190. The computer is connected by a local area network to a switch 200. The switch connects the local area network to the public service telephone network 210 and to the internet 220. Using the keyboard and/or mouse of the user's computer 180, the user can control the telephone handset 230, and the switch 200, to initiate calls, answer calls, and manipulate directories of telephone numbers. Speech signals between the handset 230 and the party at the other, end of the connection via the PSTN, may be digitized to be transmitted over the local area network.

The user's computer 180 may also use the local area network to access the internet 220. In this instance, the switch 200 handles internet traffic and PSTN traffic as two different, independent data streams. In an alternative system, the user may be able to choose to send or initiate a telephone call either via the PSTN, or as a voice-over-IP call routed through the local area network, and the switch 200, to the internet 220.

Figure 4:
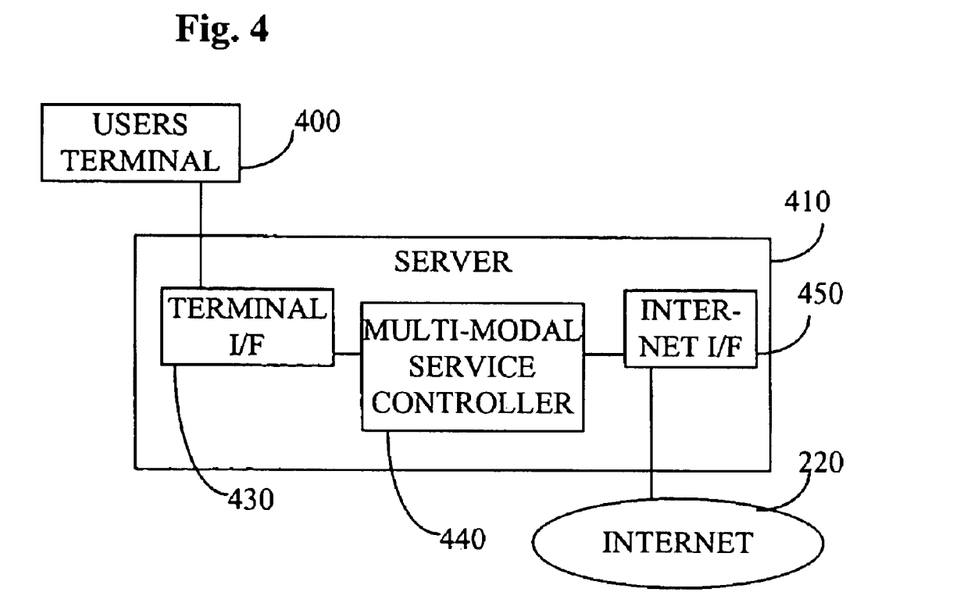
FIG. 4 shows in schematic form a server and surrounding elements, according to an embodiment of the invention.

FIG. 4—Schematic of Embodiment of Server of the Invention.

A server 410 is shown in FIG. 4 in schematic form, and connected to a user's terminal 400, and to the internet 220. Some of the principal functions of the server are shown, including a terminal interface 430, a multi-modal service controller 440, and an internet interface 450. In this arrangement, the server is used to facilitate access to the internet from the user's terminal. The terminal interface may support one or more connections, and may pass information for more than one mode of user interface. The service controller may have one or more of a number of individual functions as follows:

1. It may respond to requests from the user's terminal arriving either in a single input mode, or in multiple input modes, e.g., speech and text entered by keyboard or mouse-based selection.
2. The service controller can engage in a dialogue with the user if necessary, to clarify the nature of the query, or to explain options to the user for example. The dialogue can be initiated by the user or by the server.
3. It may be arranged to control the internet interface so as to perform complex sequences of queries, for example with subsequent queries being made according to the answers of preceding queries.
4. Responses to the user's terminal may be mode-sensitive, i.e. the service controller may determine which of multiple modes of interface to the user, is most suitable, taking into account factors such as user's preferences, the type of information, the amount of information, the reliability of the mode, for that type of information, and so on.
5. The controller may translate or adapt the information received in one interface mode, into a form suited to a different mode. For example, speech received from a user may be converted into text to be sent as an email. In another example an image received over a video channel may be converted into a synthesized speech description of the objects in the scene.
6. The service controller may pass information between the terminal interface and the internet interface.
7. The service controller may include a framework for content providers or service providers to make it easy to make available new services or new content to users. In addition, it may be arranged to be easy to add new functions to the terminal interface to support different modes and different types of user terminals.

Many user terminals may be connected to the server simultaneously, and in this case, the server would be arranged to be able to process interactions with each of them independently, or interdependently, if conferencing type services are implemented.

The server may be conveniently located close to or in a central office, or other hub of a telephone network, and could be run and managed by an internet service provider.

Figure 5:
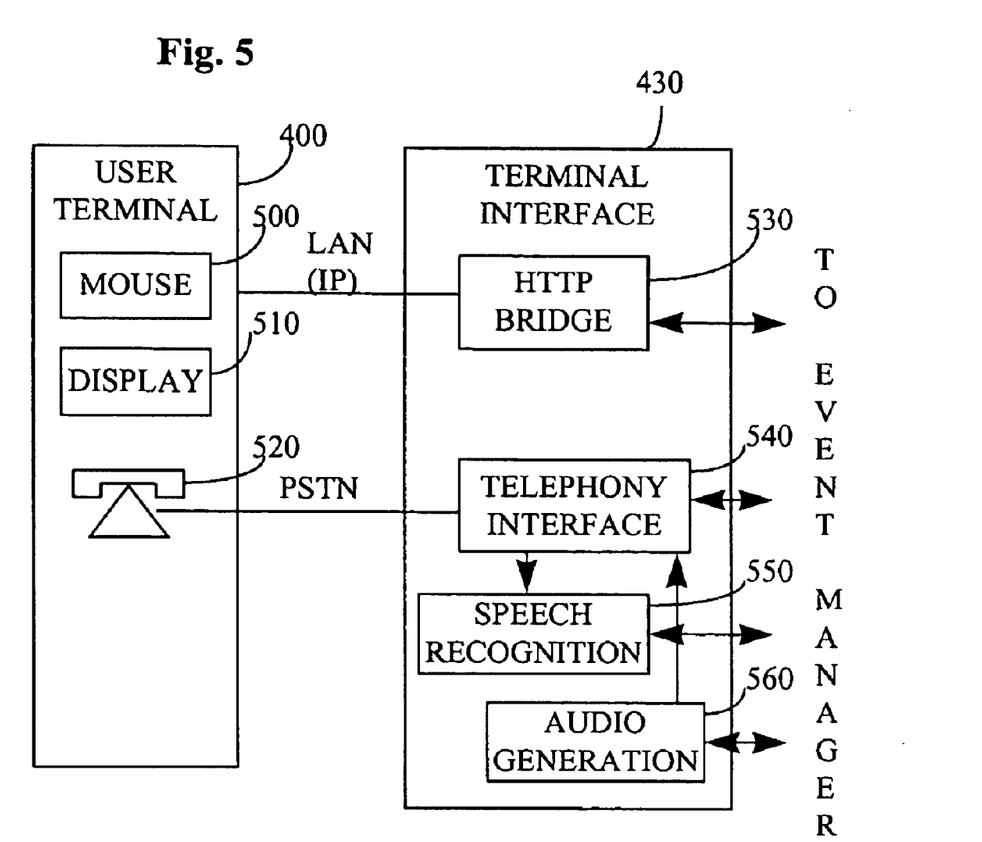
FIG. 5 shows an example of the user terminal and terminal interface of FIG. 4.

FIG. 5—Schematic of user Terminal and Server Terminal Interface.

FIG. 5 shows the user terminal 400 of FIG. 4, and in this example, the terminal includes a computer having a mouse 500 and a display 510. The user's terminal also includes a telephone 520, independent of the computer. The computer is connected by a local area network, which may use the internet protocol (IP) to the terminal interface 430 of the server 410. As shown, the telephone 520 is connected separately via the PSTN, to the terminal interface.

The terminal interface comprises an HTTP bridge 530, which connects the internet protocol local area network to other elements of the server. A telephony interface 540 is provided for connecting the PSTN to other elements of the server. In this example, a speech recognition function 550 is provided connected to the telephony interface, and an audio generation function 560 is also provided, connected to the telephony interface.

All of the above-mentioned elements of the terminal interface are connected to an event manager of the service controller, which will be described in more detail below.

The HTTP bridge is arranged to convert HTTP requests or HTML files into formats which can be handled by other elements in the server.

The telephony interface 540 is arranged to be able to initiate calls on the PSTN, answer calls, and manage the status of calls, using signalling appropriate to the PSTN. The speech recognition function can detect and recognize speech on any call made to or from the telephony interface, and can pass text to the service controller under the control of the event manager.

The audio generation function can generate audio prompts, or speech on the basis of text or commands supplied to it by the service controller, under the control of the event manager.

Figure 6:
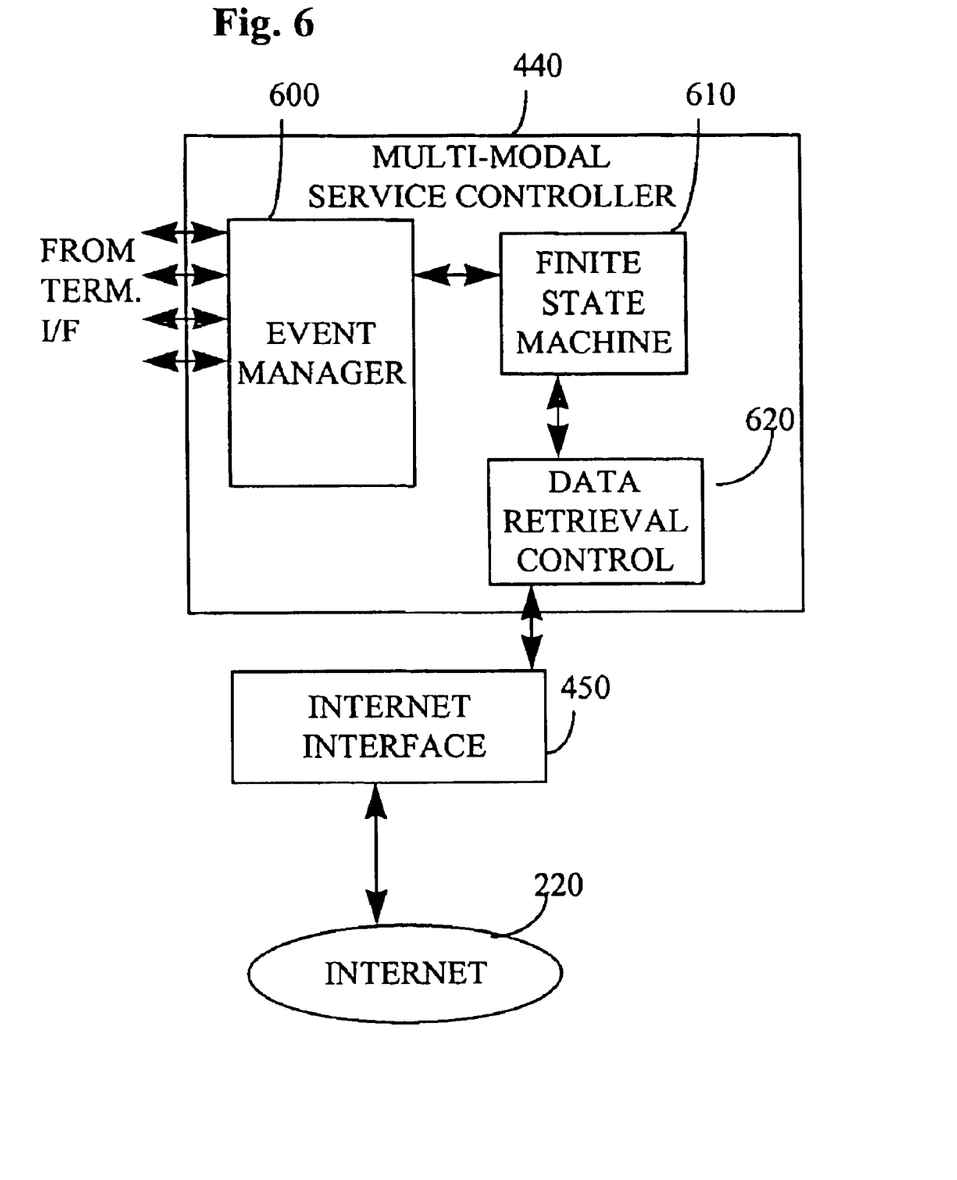
FIG. 6 shows an example of the service controller and internet interface shown in FIG. 4.

FIG. 6—Service Controller and Internet Interface.

FIG. 6 shows in schematic form examples of how the service controller of the server of FIG. 4 may be implemented. The service controller 440 comprises an event manager function 600, control logic such as a finite state machine 610, and a data retrieval control function 620. The data retrieval control has a link to the internet interface 450. The finite state machine responds to events forwarded to it by the event manager, and issues controlling commands to other elements to implement the seven functions set out above with regard to FIG. 4. The data retrieval control is operable to manage complex queries to information sources on the internet, and filter information e.g. HTML pages returned to it to extract desired data and pass it to other elements of the server.

The internet interface is a software entity which uses a physical port to access the internet. The same physical port may be used by the terminal interface to make a connection to the user across the internet.

Figure 7:
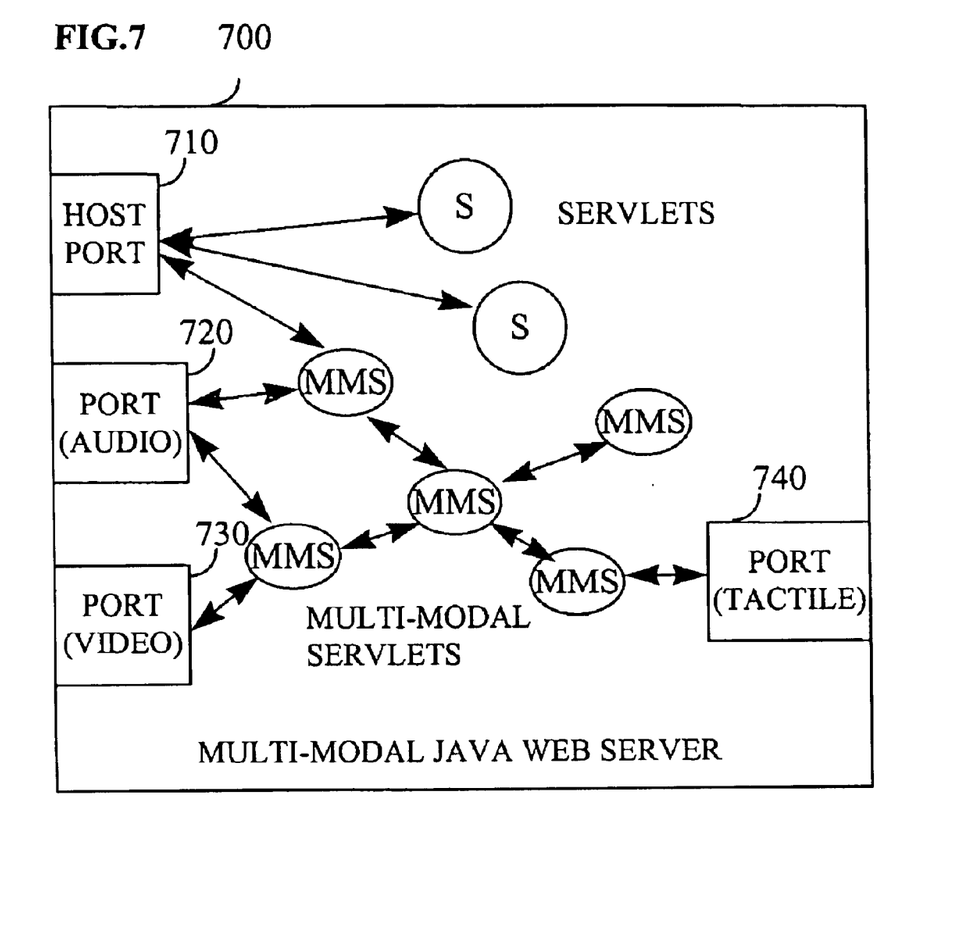
FIG. 7 shows an overview of an implementation of the server of FIG. 4, based on a Java Web server.

FIG. 7—Schematic of Java Web Server Implementation

FIG. 7 shows an overview of an implementation of the server of FIG. 4, based on a Java Web server. The Java Web server 700 comprises a host port 710, which is a physical interface to the internet. As in a conventional Java Web Server, HTTP requests from client Web browsers may be examined for a URL (Universal Resource Locator) to determine whether the server should access a file or a servlet. Servlets are shown which are Java programs which generate HTML replies, which are sent back to the browser. Unlike conventional Java Web servers, the multi-modal Java Web Server 700 is provided with a number of enhanced servlets termed multi-modal servlets (MMS) for carrying out the functions described above of the service controller, the terminal interface, and the internet interface. These will be described in more detail below.

The information flow described above to the user's terminal may pass through the host port even if the information relates to different modes of user interface. Alternatively, physical ports for passing the information in the different modal forms, may be provided, as shown in FIG. 7. A port 720 is provided for audio mode signals, a port 730 is provided for video mode signals, and a further port 740 is provided for tactile mode signals.

A Java based implementation is preferred because it provides an object oriented software environment, provides multi threading, and a variety of network interface classes. Conventionally, the Java Web Server environment provides a servlet API (Application Programming Interface) and a mechanism for managing and invoking servlets in response to received HTTP requests. The request is processed by the servlet under a handler thread running in parallel with the servlets main thread of execution. Normally a mechanism called servlet chaining is used for forwarding requests from one servlet to another. Aswell, a servlet may obtain a reference to another servlet from the Java Web Server to invoke methods belonging to the other servlet. For better coordination between servlets, the multi-modal servlets may have an enhanced communication capability, involving event-driven message passing between servlets. This will be explained in more detail below. First, an example of an architecture of multi-modal servlets to implement a voice-enabled Web server will be described.

Figure 8:
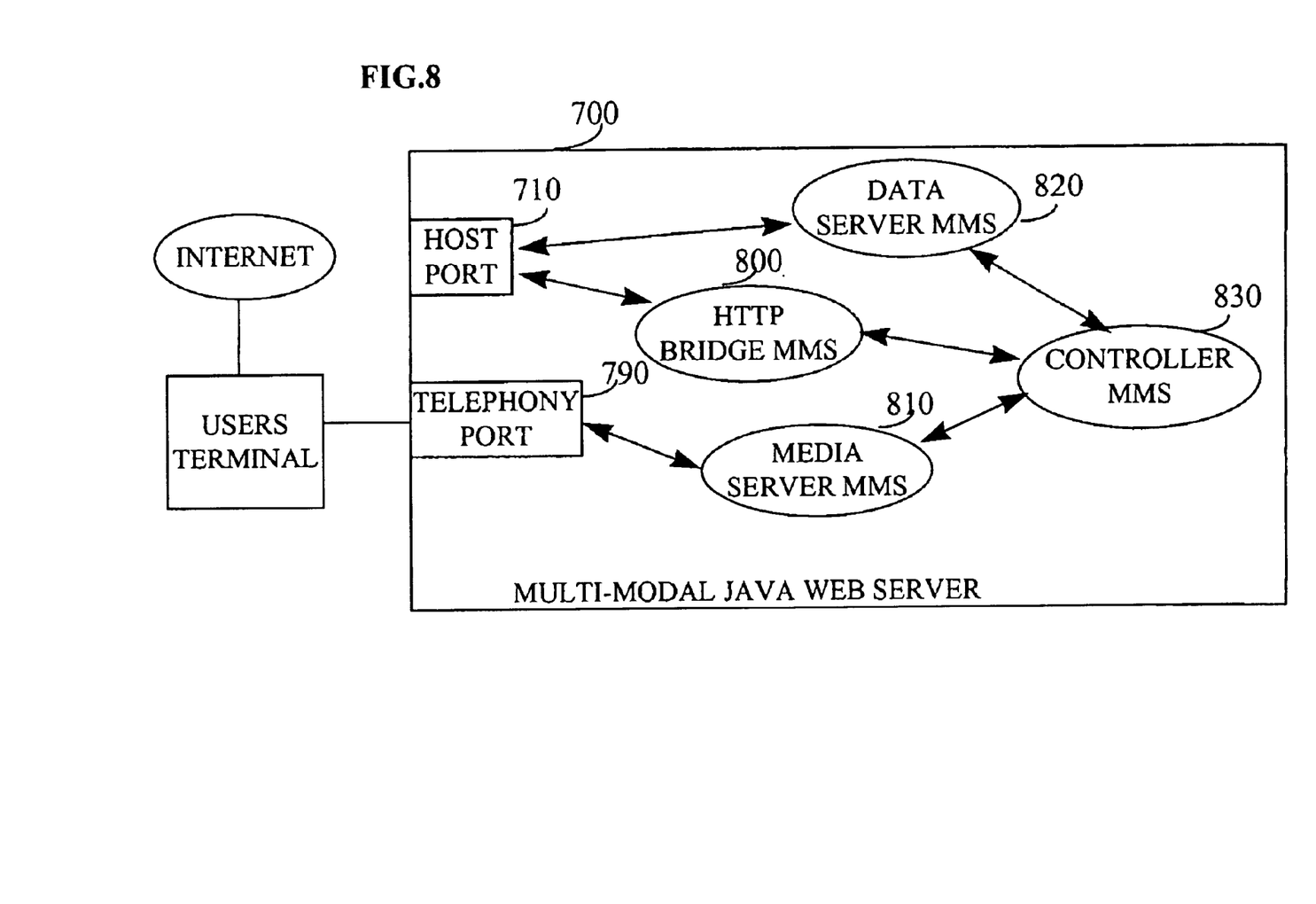
FIG. 8 shows a voice enabled Web server example of the server of FIG. 7.

FIG. 8—Voice Enabled Web Server Example.

FIG. 8 shows a host port 710, and a telephony port 790. A user's terminal may be connected to both ports, a voice link to the telephony port, and an internet link for conveying graphical information, keyboard inputs, and mouse inputs. An HTTP bridge multi-modal servlet 800 is connected to the host port. A media server servlet 810 is connected to the telephony port. A data server servlet 820 is connected to the host port. A controller multi-modal servlet 830 is connected to each of the other three multi-modal servlets 800, 810, 820. The data server MMS is capable of making queries to information sources on the internet via the host port. It can filter the replies, to extract required data, and forward the results to the controller.

The HTTP bridge is arranged to convert HTTP requests into messages which can be understood by other MMSs. It is also arranged to convert MMS messages into HTML for onward transmission over the internet. It may also be arranged to manage the internet connection to the user and handle errors.

The media server MMS provides an interface to the public service telephone network, audio prompts (pre-recorded and synthesized speech) for output onto the PSTN and speech recognition capability. Accordingly, it can be seen that the multi-modal terminal interface function is provided by the HTTP bridge and the media server MMSs, using the host port and the telephony port. The internet interface function is provided by the data server MMS using the host port.

The controller MMS is arranged to implement a programmed dialogue with the user via a multi-modal user interface on the user's terminal. The exact dialogue can be determined according to the application, and determined by a service designer.

The user's terminal can take the form of a separate telephony device, and a computer with a Web browser, or can be a single device having multimodal user interface capabilities. An example of the latter is described in above-mentioned copending U.S. patent application Ser. No. 08/992,630 filed on 19th Dec. 1997, entitled MULTIMODAL USER INTERFACE.

Figure 9:
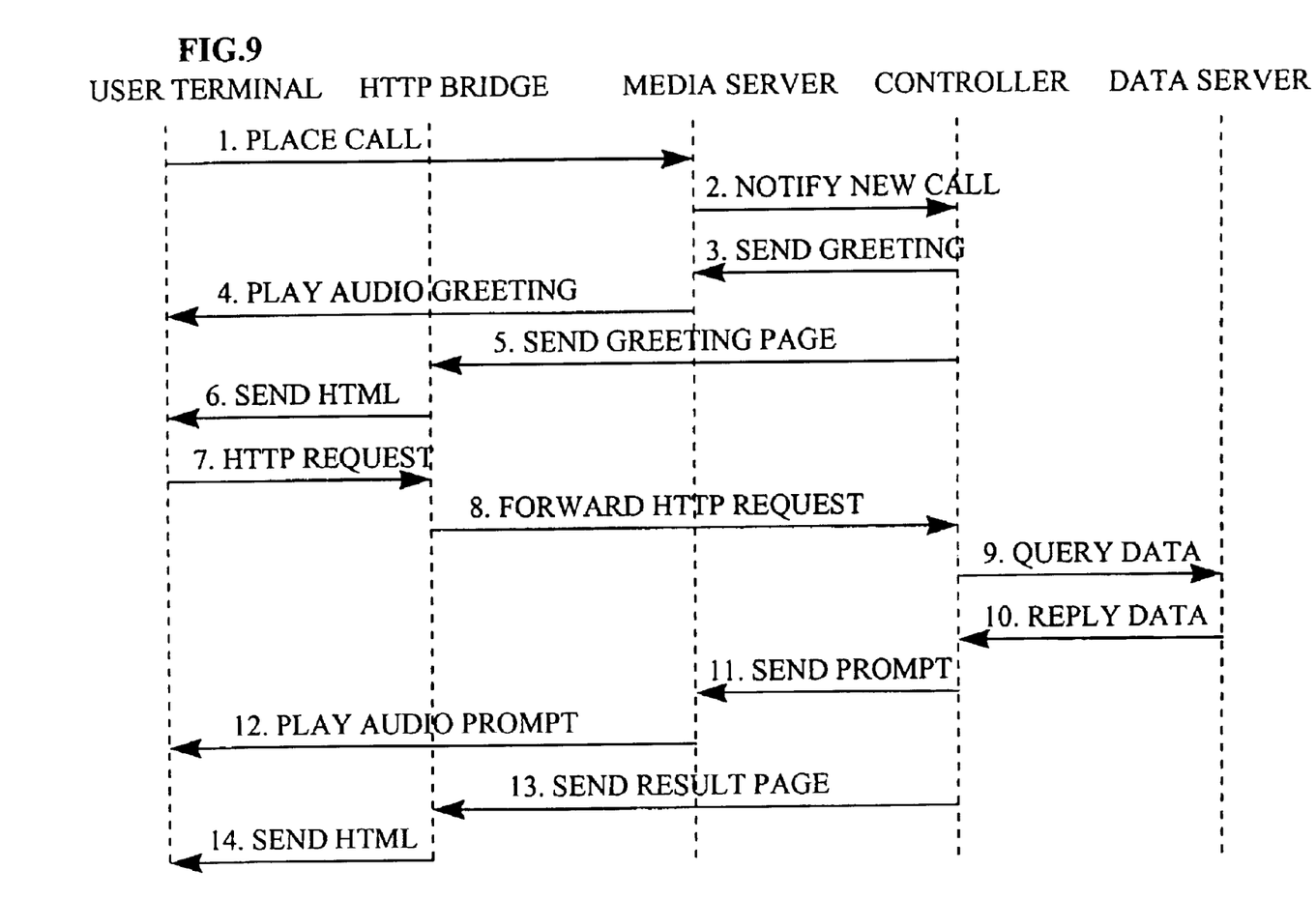
FIG. 9 shows a typical dialogue between the server and a multi-modal user terminal.

FIG. 9—Typical Dialogue Between the Server and a Multi-Modal user Terminal.

FIG. 9 shows twelve steps in a dialogue between a user's terminal and the server described in relation to FIG. 8. The actions of the user's terminal, the HTTP bridge, the media server MMS, the controller MMS, and the data server MMS are shown. The steps labelled in FIG. 9 will now be explained using corresponding numbering:

1. The user's terminal initiates a phone call to the server.
2. The media server MMS detects the phone call, answers it, and notifies the controller of the new call.
3. The controller MMS determines an appropriate play greeting message, and sends this greeting message to the media server MMS.
4. The media server plays the audio greeting message to the user's terminal over the telephone network connection.
5. The controller sends a suitable page to the HTTP bridge MMS.
6. The HTTP bridge MMS sends the HTML page to the user's terminal. (If the bridge determines that the terminal is unable to accept the page, the bridge will notify the controller accordingly, and the controller may adjust its dialogue to reflect this.)
7. The user activates a button on the displayed Web page, which causes the Web browser on the user's terminal to send an HTTP request.
8. The HTTP bridge sends an HTTP request event to the controller MMS.
9. The controller MMS sends a query event to the data server MMS.
10. The data server MMS returns data to the controller MMS.
11. The data server MMS may have filtered the required data from the pages data returned.
11. The controller MMS sends a play prompt event message to the media server MMS.
12. The media server MMS plays a corresponding audio prompt at the user's terminal using the telephone network connection.
13. The controller MMS sends a page of result data to the HTTP bridge MMS.
14. The HTTP bridge MMS sends the result page in HTML to the user's terminal where it is displayed.

Figure 10:
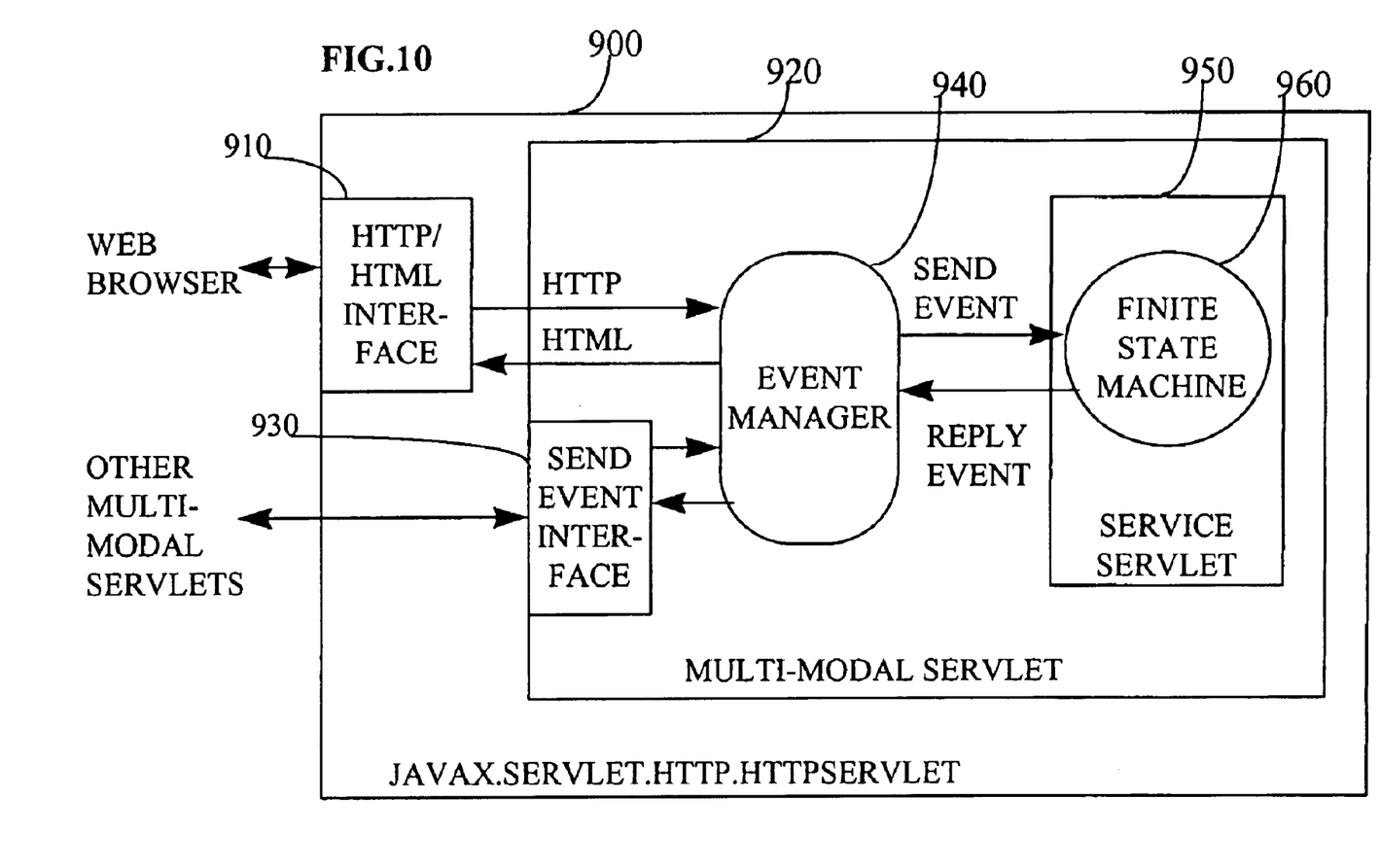
FIG. 10 shows a multi-modal servlet architecture.

FIG. 10—Multi-Modal Servlet Architecture.

The Java Web server sold by Sun Microsystems includes a servlet API which in turn includes a class called Javax. servlet.http.HttpServlet. This class, labelled 900 in FIG. 10, is already provided with an HTTP/HTML interface, 910, for communicating with Web browsers. The multi-modal servlet 920 is a subclass of the HTTP servlet class 900. It provides the following enhancements over the HTTP servlet class:

(a) an interface 930 termed the "SendEvent" interface is provided, defining a means of passing event-based messages to multi-modal servlets.
(b) a contained class 940 termed the "EventManager" is provided for implementing the SendEvent interface and providing a threaded queue to avoid deadlocks when multi-modal servlets send events to one another.
(c) a mechanism to register a "manageable" object with the event manager. The manageable object may process events forwarded to it by the event manager and generate reply events to send to other multi-modal servlets. The service servlet 950 shown in FIG. 10 contains one or more finite state machines 960 which are subclasses of Manageable objects.
(d) a mechanism to use the Java Web Server's look-up-by-name facility to allow one MMS to obtain a reference to another MMS, and thereby its SendEvent interface, in order to send it an event.

An administrative servlet is provided as part of the Java Web Server to start an appropriate set of MMSs running. The administrative servlet will specify what MMS are to be started, and what are their initial parameters. Another standard servlet takes an incoming URL received from a Web browser, and directs the HTTP request to the appropriate Servlet or MMS.

Figure 11:
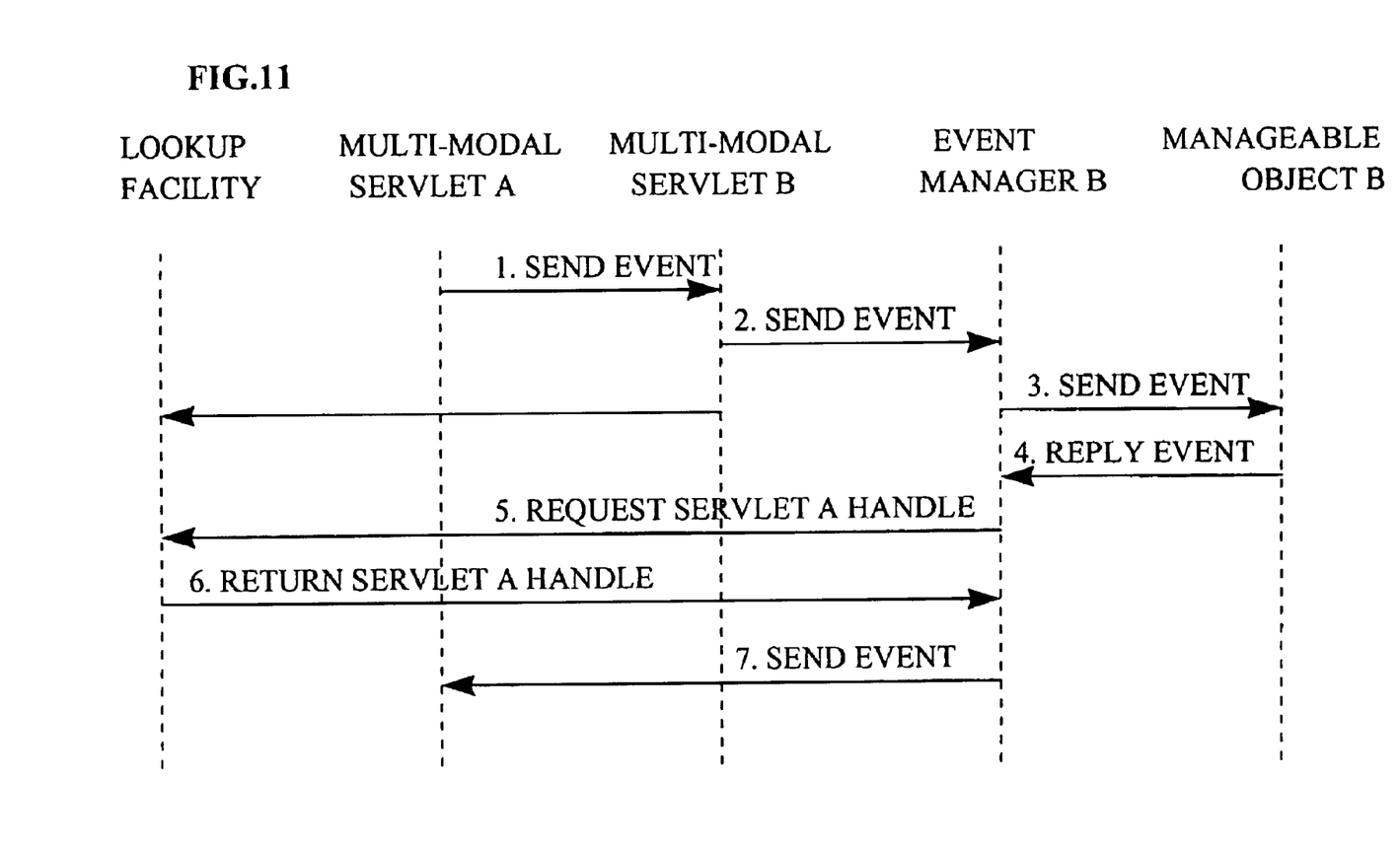
FIG. 11 shows a sequence diagram indicating the operation of the event processing by the architecture of FIG. 10.

FIG. 11—Operation of the Event Processing.

FIG. 11 shows interactions between the look-up facility, a first multi-modal servlet A, a second multi-modal servlet B, the event manager of B, and a manageable object registered with event manager B. The steps will be explained with reference to numerals corresponding to those in the FIGURE:

1. MMS A sends an event to MSSB B.
2. MMS B sends the event to its event manager.
3. The event manager sends the event to the manageable object registered with the event manager.
4. The manageable object processes the event to generate a reply event. The reply event is sent to the event manager.
5. The event manager, in order to send the reply event to Servlet A, requests a handle for Servlet A from the look-up facility.
6. The Java server look-up facility returns the Servlet A handle to event manager B.
7. The event manager sends the reply events to Servlet A using the reference obtained.

Figure 12:
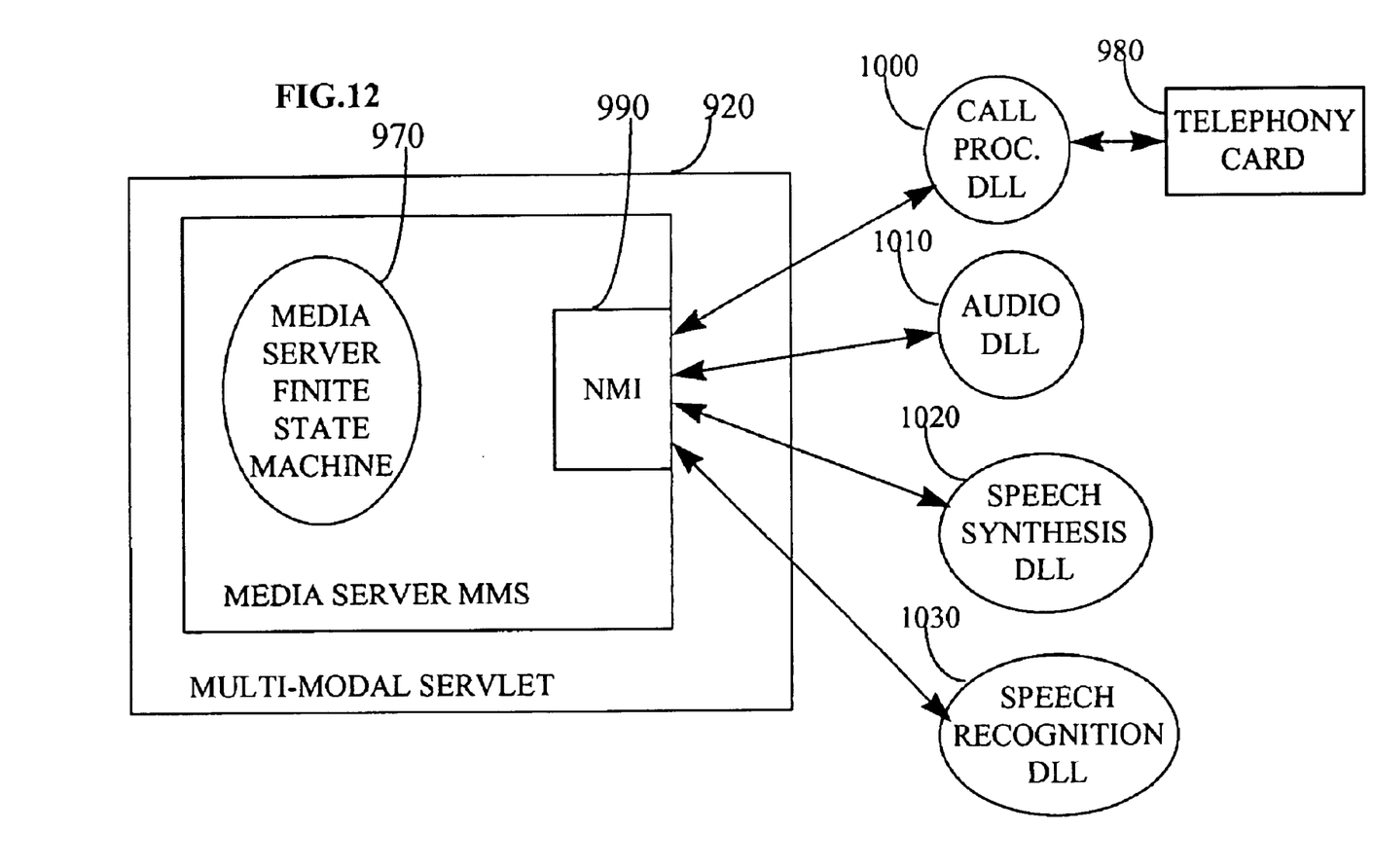
FIG. 12 shows the media server MMS of FIG. 8.

FIG. 12—Media Server MMS.

The media server MMS is a subclass of the MMS 920. It manages the telephony port 790 shown in FIG. 8. In addition to having an event manager 940, and a send event interface 930, (not shown), it is provided with a finite state machine for overall control of the media server MMS. To manage the telephony port, shown in the form of a telephony card 980, use is made of the Java Native Method Interface (NMI), to enable Java programs to interface with external libraries such as Dynamic Link Libraries (DLL). The NMI 990 is linked to a core processing DLL 1000, an audio recording and playback DLL 1010, a speech synthesis DLL 1020, for synthesizing speech from text, and a speech recognition DLL 1030, for generating text from speech.

The media server finite state machine 970 is arranged to handle initialization, dispatch of commands to external DLLs, receipt of replies from the DLLs, and communication with other MMSs. Implementation of these DLLs, and the phone card 980 can follow well established principles, and therefore need not be described in more detail here.

The NMI is the preferred method for interfacing with low level device drivers or pre-existing software modules supplied in native binary format. An alternative way is to wrap these binary format modules in a native program which provides a socket connection to Java. This complicates the design by creating another process. It is inefficient because data needs to be packed and unpacked to be sent over the socket. Another alternative is to use program components which already have a Java API, which enable them to be run in the Java environment.

HARDWARE EXAMPLES

In principle, the server could be implemented on a wide range of different types of well known hardware. If the server is implemented as a Java server, it could be run on any machine which supports the Java run time environment, and the necessary hardware interface. Examples include Unix or Windows based workstations, or network computers (an example of a thin client) and other devices running Java or Java OS (Operating System), such as devices using a custom processor chip dedicated to Java, or other network appliances such as those running the Windows CE operating system.

Computationally intensive parts such as the speech recognition, may be run on dedicated hardware. Implementations of this; can follow well known design principles, and so need not be described in more detail here. Such hardware could be connected to the server hardware through either a system bus to give a direct connection to the main processor. Alternatively the dedicated hardware could be stand alone and connected over a network connection such as an ethernet link. In principle the separate hardware elements could be widely distributed.

Figures 13, 14:
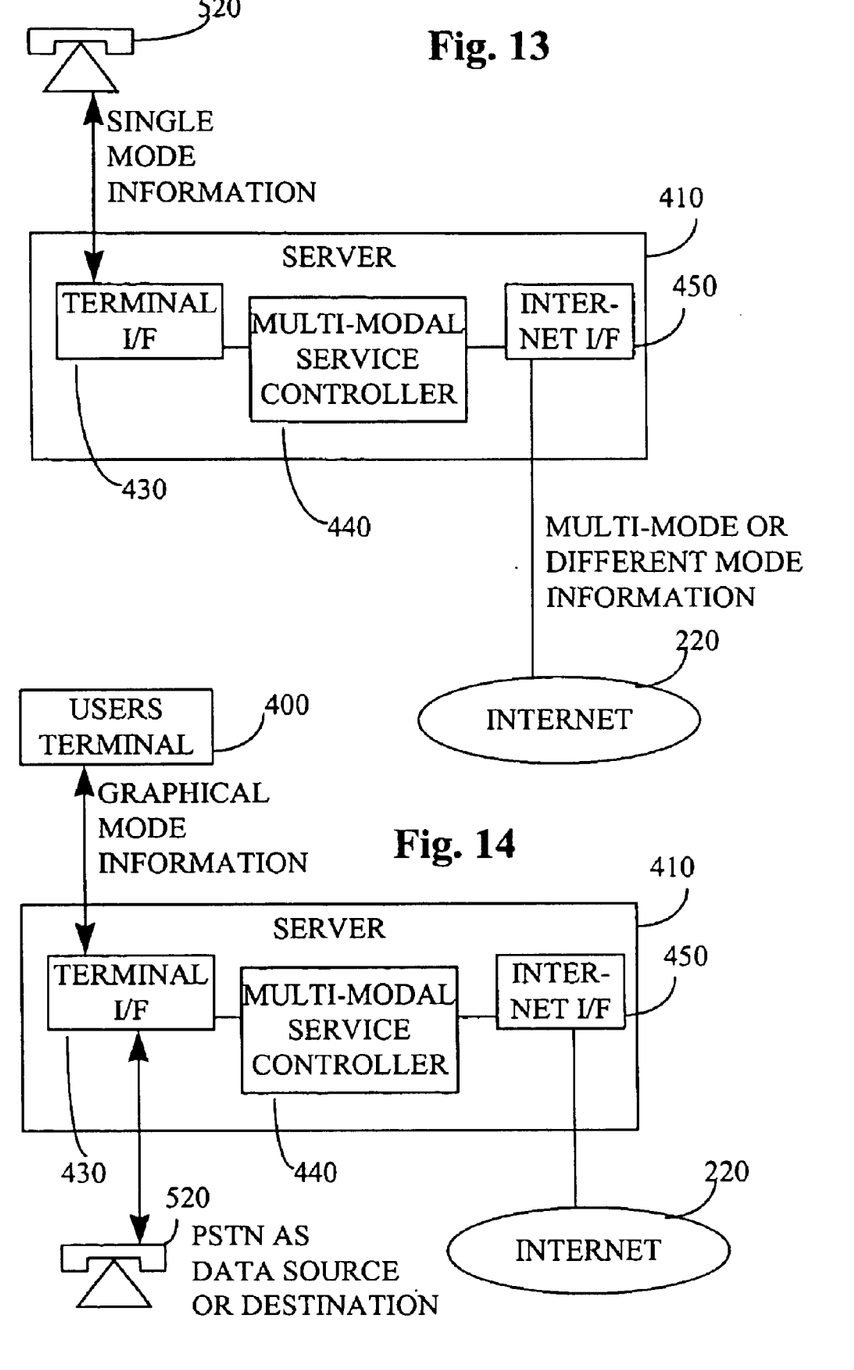
FIGS. 13 and 14 show alternative configurations of the server.

FIGS. 13,14—Use with Single mode user Terminals.

FIG. 13 shows a server using the same reference numerals as FIG. 4. In this case, it is being used with a user's terminal 520 in the form of a telephone which is capable of passing information to a user in only a single interface mode, that is audio. In this embodiment the service controller will include for example dialogues suitable for explaining in synthesized voice, the content of, text pages read from the internet, or text email messages obtained over the internet.

In the embodiment of FIG. 14, a server is shown which again uses reference numerals corresponding to those in FIG. 4. In this case, the user's terminal 400 is only capable of interfacing with a user in a graphical mode, e.g., by displaying Web pages, and accepting text or mouse inputs. The terminal interface is connected to the PSTN, and able to use it as a data source or destination, by making telephone calls to remote telephone terminals 520.

In this case, the service controller will include dialogues enabling a user to access telephone based services, or leave voicemail messages, or even engage in synthesized conversations. Voicemails left for a user could be converted into text and sent to the user's terminal 400. In this case, the user's terminal could be connected to the server through the internet, and thus through the same physical port on the server as is used by the internet interface.

Concluding Remarks

The embodiments discussed above can address a number of issues:

1) How to develop multi-modal telephony applications that combine graphical input and output with traditional speech-based user interfaces;
2) How to develop telephony applications that access information from network-based information sources, especially those on the Web;
3) How to structure telephony applications so that they are modular, object-oriented, event-driven, and distributed;
4) How to manage the configuration and run-time control of such applications and their component modules.

They provides a way to integrate telephony with Web-based information services. They also make it easier to test and develop generic multimodal user interfaces, which will be of increasing importance as wireless or wired "smart phones" become popular.

As can be seen, five elements can make notable contributions to the embodiments described, as follows. Java provides an object-oriented software environment, multi-threading, and a variety of network interface classes. These classes simplify the task of writing applications which can directly access the internet. A second element is the Java Web Server, which adds the servlet API and a mechanism for managing and invoking servlets in response to information requests from Web browsers. A third element is the MediaServerServlet developed to enhance the Java Web Server with telephony (originate and answer calls, play and record audio) and speech (recognize speech, generate synthetic speech) functionality. A fourth element is the HTTPBridge, a servlet that mediates between HTML/HTTP traffic outside the Web Server and event-driven messages inside. A fifth element is the EventManager class hierarchy, that was developed to provide a means for servlets to communicate with one another using event-driven messages.

The architecture described above comprises a set of modules (servlets) that run on the Java Web Server, a product of Sun Microsystems. The servlets provide a framework for the development of telephony applications that employ multi-modal user interfaces. Interface modes supported in one embodiment are speech (recorded audio prompts and synthesized speech, and speech recognition) and graphics (standard Web browser graphics and user input based on HTML/HTTP). The Sun Java Web Server is a proprietary product, but the multi-modal server can be based on Web Servers from any vendors that support the Servlet API on a PC.

Other Variations

Although in the embodiments described, there is shown a direct connection to the user's terminal, this can of course be indirect, e.g. via other servers on the internet, or other networks.

Although the term "user" may mean a human user, it is also intended to include apparatus which could provide responses to satisfy the terminal interface on the server automatically, e.g. software agents acting on behalf of a human user.

Numerous terminals may be served simultaneously and the terminals may be of different types. A terminal may have more than one connection to the server running simultaneously, to enable multiple interface modes to be used, or to run simultaneously many services for the same user.

A new set of servlets may be instanciated for each service for each user.

Although Web servers on the internet are conventionally passive, and respond only to queries sent to them from e.g. Web browsers, the server described above can be arranged to run a service which involves alerting a user without waiting for a query from the user. This can be achieved by making a phone call to the user, or by simulating a query from the user, to trigger a response from the server to the user. This would enable paging type services to be offered, enhanced over conventional paging services since information in multimodal forms may be transmitted.

Other variations within the scope of the claims will be apparent to persons of average skill in the art.

What is claimed is:

1. A server for handling information which is in different modal forms suitable for more than one mode of user interface, the server comprising:

an internet interface for supporting one or more connections on the internet;

a terminal interface for supporting one or more connections from the server to user terminals providing multi-modal user interfaces capable of supporting input and output in one or more of audio, visual and tactile modal forms, and for passing information in audio, visual and tactile modal forms; and a service controller being operable to interact with the user terminals for controlling input or output of the information on the terminal interface and the internet interface, and for processing the information received from or sent to either interface, according to the modal form of the input and output the service controller being operable to receive input in different modal forms simultaneously from a user interaction at the multimodal interface, and to resolve conflicts.

2. The server of claim 1, the service controller being operable with a multi-modal user terminal to select which modal form or forms of input and output to use.

3. The server of claim 2, the service controller being arranged to select which modal form or forms to use according to the content of the information, and the context of the user interaction.

4. The server of claim 1, the service controller being operable to determine an intention of the user based on the inputs.

5. The server of claim 1, the terminal interface being arranged to recognize speech as an input.

6. The server of claim 1, the terminal interface being arranged to generate audio as an output mode.

7. The server of claim 1, the service controller being arranged to conduct a dialogue with the user in the form of a sequence of interactions.

8. The server of claim 1, further comprising means for initiating a connection to the user's terminal.

9. The server of claim 1, further comprising a link to a telephone network, and a call processor for making and receiving telephone calls on the telephone network.

10. The server of claim 1, comprising a set of servlets arranged to communicate with each other by event driven messages.

11. A server for interfacing between telephone calls and the internet, and comprising:

a terminal interface for supporting one or more connections from the server to user terminals-providing multi-modal user interfaces capable of supporting input and output in one or more of audio, visual and tactile modal forms, the terminal interface providing a telephony interlace for receiving or making a telephone call, and arranged to interact with a user on the call by recognizing speech or generating audio signals;

an internet interface for receiving or outputting information from or to other parts of the internet; and a service controller for controlling interaction between the terminal interface, telephony interface and the internet interface, the service controller being operable to interact with a user having a terminal capable of handling telephony or internet communications, to select which modal form or forms to use for controlling input or output of the information on the terminal interface and the internet interface, according to the modal form of the input and output, and the service controller being operable to receive input in different modal forms simultaneously from a user interaction at the multimodal interface, and to resolve conflicts.

12. The server of claim 11, wherein the controller is operable to select which of telephony or internet communications to use when sending information to the terminal, and to convert the information to suit the selected type of communication.

13. A method of using a server to handle information in different modal forms suitable for more than one mode of user interface, and comprising the steps of:

supporting one or more connections on the internet;

supporting one or more connections from the server to user terminals having a multi-modal user interface capable of supporting user input and output in one or more of audio, visual and tactile modal forms; and for each user input, passing information in different modal forms between the user and the server;

processing the information received from or sent to either interface, according to the modal form of the input and output and when receiving inputs in different modal forms simultaneously from the same user input and, resolving conflicts.

14. A method of using a multi-modal service provided by a server on the internet, the server having an internet interface for supporting one or more connections on the internet, a terminal interface for supporting a connection to a user of the service, and for passing information in one or more of audio, visual and tactile modal forms; and a service controller for controlling input or output of information on the terminal interface and the internet interface, and for processing the information received from or sent to either interface, according to the modal form, the method comprising the step of:

providing input to the terminal interface of the server;

engaging in a dialogue with the server to cause the server to process the information according to the modal form of the information; and receiving a response from the terminal interface of the server, according to the result of the information processing and when receiving inputs in different modal forms simultaneously from the terminal interface, resolving conflicts, and determining an intention of the user based on the inputs.

15. Software on a computer readable medium for carrying out a method of using a server to handle information in different modal forms suitable for more than one mode of user interface, the method comprising the steps of:

supporting one or more connections on the internet;

supporting one or more connections from the server to the user terminals, having multi-modal user interfaces capable of supporting user input and output in one or more of audio, visual and tactile modal forms;

passing information in different modal forms between a user terminal and the server;

controlling input or output of the information on the terminal and internet connections; and processing the information received from or sent to the terminal and internet interface, according to its modal form, resolving conflicts when receiving inputs modal forms simultaneously from the same user.

16. A server for handling information which is in different modal forms suitable for more than one mode of user interface, the server comprising:

an internet interface for supporting one or more connections on the internet;

a terminal interface for supporting one or more connections from the server to user terminals having a multi-modal user interface capable of supporting user input and output in one or more of audio, visual and tactile modal forms and for passing information in at least one of the modal forms; and a service controller being operable to interact with a multi-modal terminal, to select which modal form or forms to use, and for controlling information from user input or output on the terminal interface and the internet interface according to the modal form of the user input and output; and the service controller being operable to receive inputs in different modal forms simultaneously from the same user, to resolve any conflicts, and determine an intention of the user based on the inputs.

\* \* \* \* \*